United States Patent
Tomizawa et al.

(10) Patent No.: US 8,605,492 B2
(45) Date of Patent: Dec. 10, 2013

(54) MEMORY DEVICE, RECORDING METHOD, AND RECORDING AND REPRODUCING METHOD

(75) Inventors: Yasushi Tomizawa, Tokyo (JP); Kazuo Watabe, Kanagawa-ken (JP); Akihito Ogawa, Kanagawa-ken (JP); Yangfang Li, Kanagawa-ken (JP); Akihiro Koga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 281 days.

(21) Appl. No.: 13/235,630

(22) Filed: Sep. 19, 2011

(65) Prior Publication Data

US 2012/0250428 A1   Oct. 4, 2012

(30) Foreign Application Priority Data

Mar. 28, 2011 (JP) ................. P2011-069143

(51) Int. Cl.
*G11C 11/00* (2006.01)

(52) U.S. Cl.
USPC .......................................... 365/158; 365/191

(58) Field of Classification Search
USPC ........................................................ 365/158
See application file for complete search history.

(56) References Cited

U.S. PATENT DOCUMENTS

| | | | |
|---|---|---|---|
| 6,917,049 B2 * | 7/2005 | Krah et al. | 250/559.1 |
| 8,359,661 B2 * | 1/2013 | Tachizaki et al. | 850/47 |
| 2010/0079910 A1 | 4/2010 | Tomizawa et al. | |

FOREIGN PATENT DOCUMENTS

JP   2007-048330   2/2007

* cited by examiner

*Primary Examiner* — Anthan Tran
(74) *Attorney, Agent, or Firm* — Turocy & Watson, LLP (57) ABSTRACT

A memory device, includes a recording medium; a probe to write a plurality of the signals; a first driving portion to vibratory drive the recording medium; a detecting unit which, when the first driving portion changes a frequency to vibratory drive the recording medium, detects a change in an amplitude of the resonance drive, detects the frequency at which the amplitude becomes maximum as a resonance frequency; and a calculating unit which calculates a timing when the probe writes a plurality of the signals using the resonance frequency; wherein, the first driving portion vibratory drives the recording medium and the probe writes a plurality of the signals.

14 Claims, 6 Drawing Sheets

MEMORY DEVICE, RECORDING METHOD, AND RECORDING AND REPRODUCING METHOD

CROSS-REFERENCE TO RELATED APPLICATIONS

This application is based upon and claims the benefit of priority from the prior Japanese Patent Application No. 2011-069143, filed on Mar. 28, 2011, the entire contents of which are incorporated herein by reference.

FIELD

Embodiments described herein relate generally to a memory device, a recording method, and a recording and reproducing method.

BACKGROUND

In a memory device to record and reproduce a signal using a probe, it is necessary to perform positioning the probe in a plane by relatively driving a recording medium to record the signal and the probe in an x axis direction and a y axis direction. In this time, in order to relatively drive the recording medium and the probe with a large stroke at a low energy, it is proposed to use resonance drive in at least one axis direction of the x axis and y axis directions.

However, in case that the resonance drive is performed, as a speed of the probe in this direction changes for positions, unevenness is generated in the pitches (pitches) between bits at the time of writing bits at equal time intervals, for example. For the reason, it is not possible to record signals in a high density.

DETAILED DESCRIPTION

According to one aspect of embodiments, there is provided a memory device including a recording medium to store a signal, a probe to write a plurality of the signals in the recording medium in a first direction, a first driving portion to vibratory drive the probe or the recording medium in the first direction; a detecting unit which, before a writing operation, when the first driving portion changes a frequency to vibratory drive the probe or the recording medium in the first direction, detects a change in an amplitude of the resonance drive, and detects the frequency at which the amplitude becomes maximum as a resonance frequency, and a calculating unit which, before the writing operation, calculates a timing when the probe writes a plurality of the signals into the recording medium using the resonance frequency. Here, at the time of writing, the first driving portion vibratory drives the probe or the recording medium in the first direction at the resonance frequency, and the probe writes a plurality of the signals into the recording medium at the timing.

According to another aspect of embodiments, there is provided a recording method to record a signal, by vibration-driving a probe which writes the signal in a first direction or the recording medium in a first direction, in the recording medium for storing the signal.

The recording method includes detecting a change in an amplitude of the resonance drive when the probe or the recording medium is vibration-driven in the first direction by changing a frequency, detecting the frequency at which the detected amplitude becomes maximum as a resonance frequency, calculating a timing when the probe writes the signal into the recording medium using the detected resonance frequency, and vibration-driving the probe or the recording medium in the first direction at the resonance frequency at the time of writing, and writing a plurality of the signals into the recording medium at the detected timing by the probe.

According to other aspect of embodiments, there is provided a recording and reproducing method to record and reproduce a signal by vibration-driving a probe to write the signal in a recording medium to store the signal in a first direction or the recording medium in the first direction. The recording and reproducing method includes detecting a change in an amplitude of the resonance drive when the probe or the recording medium is vibration-driven in the first direction by changing a frequency, detecting the frequency at which the detected amplitude becomes maximum as a resonance frequency, calculating a timing when the probe writes the signal into the recording medium using the detected resonance frequency, vibration-driving the probe or the recording medium in the first direction at the resonance frequency at the time of writing, and writing a plurality of the signals into the recording medium at the detected timing by the probe; and reading the signals from the recording medium by the probe.

Hereinafter, embodiments will be described.

A construction of a memory device 100 according to the present embodiment will be described in detail with reference to FIG. 1 to FIG. 4.

Figure 1A:
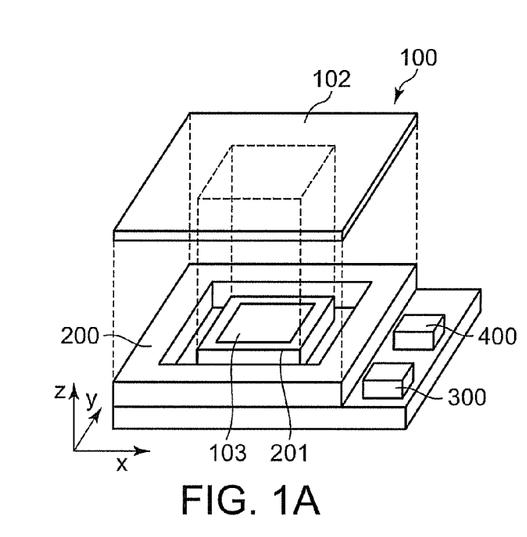
FIG. 1 is a schematic diagram of a memory device according to an embodiment.
Figure 1B:
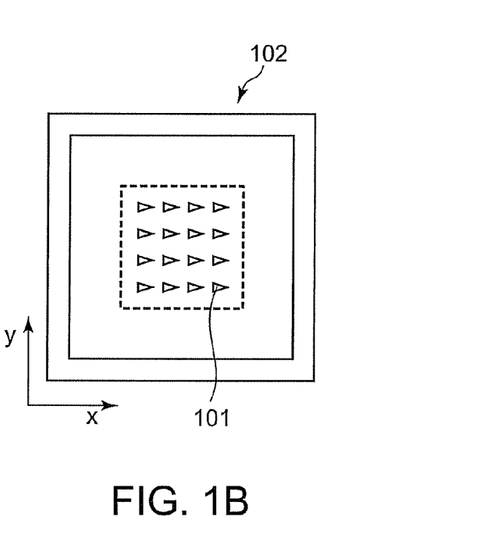

The memory device 100 shown in FIG. 1(a) is provided with a recording medium 103 which can hold data (hereinafter, signals), a probe unit 102 (FIG. 1(b)) in which a plurality of probes 101 each for writing and reading (hereinafter, records and reproduces) signals to and from the recording medium 103 are arranged in a matrix shape, an actuator 200 so as to relatively move the recording medium 103 for the probe 101, an MPU 300 which takes control of recording and reproducing the signals, and driving the actuator 200, and a memory 400 such as a DRAM which can hold signals temporarily.

A plurality of probes 101 in the probe unit 102 are arranged so as to face the recording medium 103 across a first space. At the non-record reproduction time, that is, when recording and reproducing are not performed, the probes 101 and the recording medium 103 are in a separated state. At the time of recording and reproducing, the actuator 200 moves the recording medium 103 to thereby make the probes 101 contact with the recording medium 103.

In this contacted state, a prescribed voltage is applied to the electrode of the probe 101, and thereby record reproduction of a signal is performed between the probe 101 and the recording medium 103.

The recording medium 103 is a thin film which can hold change in an electrical state as a signal, for example.

In the present embodiment, an actuator of an electrostatic drive type which can drive in three axes (x, y, z axis) directions is used as the actuator 200. In the x axis direction out of these directions, the actuator 200 performs resonance drive so as to obtain a large stroke at a low voltage, and in each of the y axis and z axis directions performs translation drive in one direction.

Figure 2:
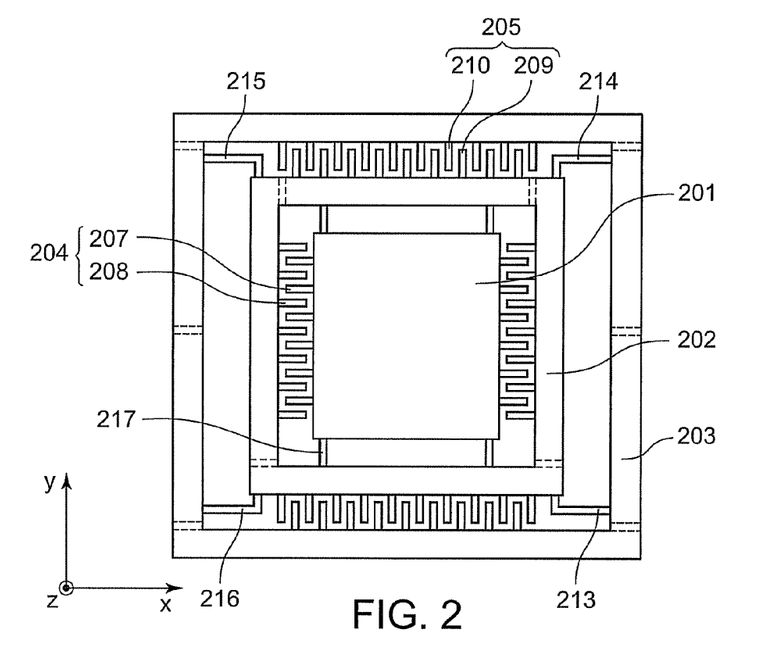
FIG. 2 is a top view of an actuator used in the memory device according the embodiment.

The actuator 200 shown in FIG. 2 is provided with a stage (movable portion) 201 of a rectangular flat plate so as to load the recording medium 103, a movable frame 202 which is provided around the stage 201 through a second space, and a fixed frame 203 which is provided around the movable frame 202 through a third space.

The fixed frame 203 supports the movable frame 202 with electrically conductive supporting members 213, 214, 215 and 216. In addition, the movable frame 202 supports the stage 201 with electrically conductive supporting members 217.

If it is assumed that a plane of the stage 201 is arranged along an xy plane shown in FIG. 2, a first driving portion 204 is provided in the second space and resonance drives the stage 201 in the x axis direction in FIG. 2. A second driving portion 205 is provided in the third space and drives the stage 201 and the movable frame 202 integrally in the y axis direction. In addition, a third driving portion 206 is provided and drives the stage 201 in the z axis direction.

The first driving portion 204 is provided with a plurality of first movable electrodes 207 and a plurality of first fixed electrodes 208 each having the same rectangular shape which are arranged in line (in the y axis direction) at equal intervals, respectively. A plurality of the first movable electrodes 207 which are provided at side faces of the stage 201 and a plurality of the first fixed electrodes 208 which are provided at side faces of the movable frame 202, project in the x axis direction in the second space, respectively. In this case, it is preferable that the first movable electrodes 207 and the first fixed electrodes 208 are arranged respectively out of alignment in the y axis direction by ½ of the pitch of the electrodes so as to be engaged with each other.

This first driving portion 204 moves the stage 201 in the x axis direction by electrostatic forces acting in the x axis direction between the adjacent first movable portion electrodes 207 and the first fixed portion electrodes 208, respectively. In this time, the stage 201 is resonance-driven in the x axis direction as described above.

The second driving portion 205 is provided with a plurality of second movable portion electrodes 209 and a plurality of second fixed portion electrodes 210 each having the same rectangular shape which are arranged in line (in the x axis direction) at equal intervals, respectively. A plurality of the second movable portion electrodes 209 which are provided at side faces of the movable frame 202 and a plurality of second fixed portion electrodes 210 which are provided at side faces of the fixed frame 203, project in the y axis direction in the third space, respectively. In this case, it is preferable that the second movable portion electrodes 209 and the second fixed portion electrodes 210 are arranged respectively out of alignment in the x axis direction by ½ of the pitch of the electrodes so as to be engaged with each other.

This second driving portion 205 moves the stage 201 and the movable frame 202 integrally in the y axis direction by electrostatic forces acting in the y axis direction between the adjacent second movable portion electrodes 209 and the second fixed portion electrodes 210, respectively.

In addition, in the present embodiment, the stage 201, the movable frame 202 and the fixed frame 203 are constructed specifically so that the first movable electrodes 207 and the first fixed electrodes 208 are respectively in an electrically insulated relation, and the second movable portion electrodes 209 and the second fixed portion electrodes 210 are respectively in an electrically insulated relation.

Figure 3:
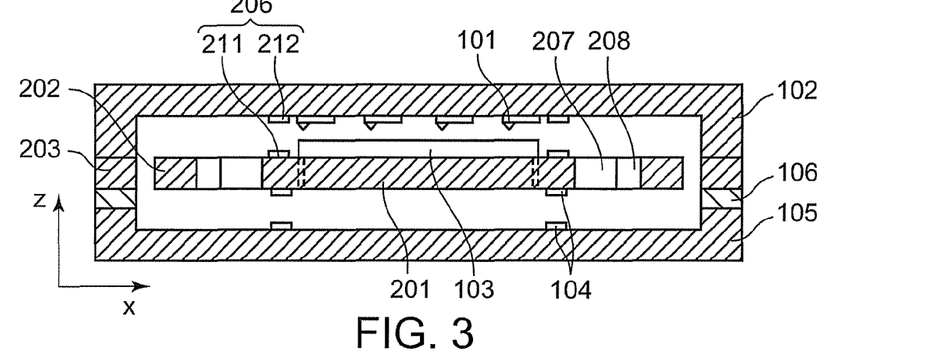
FIG. 3 is a sectional view of the memory device according to the embodiment.

In the third driving portion 206, rectangular first flat plate electrodes 211 provided at peripheral portions on the stage 201 and rectangular second flat plate electrodes 212 provided at the probe unit 102 facing the stage 201 through the first space are arranged facing to each other while sharing their central axes (FIG. 3).

This third driving portion 206 moves the stage 201 in the z axis direction by electrostatic forces acting in the z axis direction between the first flat plate electrodes 211 and the second flat plate electrodes 212 to thereby make the probe 101 and the recording medium 103 in the contact state.

A cap 105 is jointed to the actuator 200 with a bonding portion 106, for example, to thereby package the recording medium 103. Because it is required that this cap 105 is in the electrically insulated relation with the actuator 200, the bonding portion 106 is preferably made of insulating material.

In position sensors 104, flat plate electrodes which are provided at four corners of a rear face of a face of the stage 201 on which the recording medium 103 is to be loaded and flat plate electrodes which are provided at four corners of the cap 105 are arranged to face to each other, respectively. And the displacements of the stage 201 in the x, y, z axis directions are measured by the change in electrostatic capacitances generated by the change in facing areas or distances or the like between these flat plate electrodes.

In addition, for the first driving portion 204, the second driving portion 205 and the third driving portion 205, an actuator of an electrostatic drive type is not limited, but an actuator of a magnetic drive type or a piezo drive type can be used for them, for example.

In addition, in place of driving the stage 201 in the z axis direction by the third driving portion 206, the probes 101 and the recording medium 103 can be made in the contact or non-contact state by driving the probe 101 alone or driving a plurality of the probes 101 simultaneously in the z axis direction.

Figure 4:
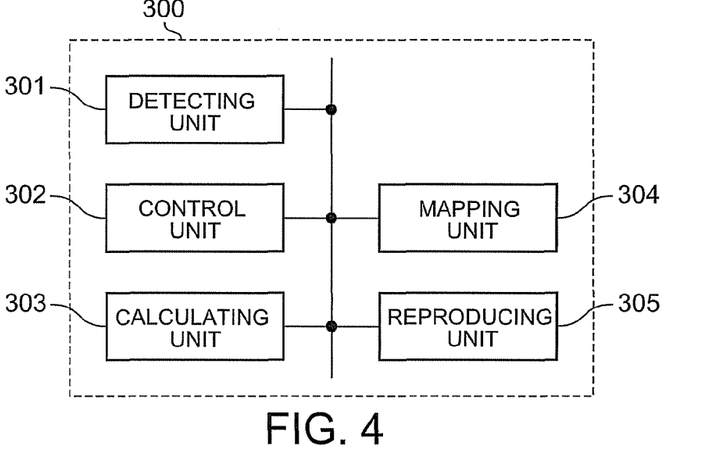
FIG. 4 is a configuration diagram of an MPU.

FIG. 4 is a system configuration diagram of the MPU 300.

The MPU 300 is composed of a detecting unit 301 to detect a resonance frequency of the stage 201, a control unit 302 to assume driving each of the driving portions and voltage application of the probes 101, a calculating unit 303 to calculate a writing timing of the probe 101 at a recording time, a mapping unit 304 to reproduce an arrangement of bits at the time of reading out the written signals (bits), and a reproducing unit 305 to discriminate a bit to thereby finally reproduce a signal.

Hereinafter, an operation of the MPU 300 will be described with reference to FIG. 5 to FIG. 12. In addition, here it is assumed that the third driving portion 206 moves the stage 201 in the z axis direction and the probes 101 and the recording medium 103 are in the contact state.

(Writing)

Figure 5:
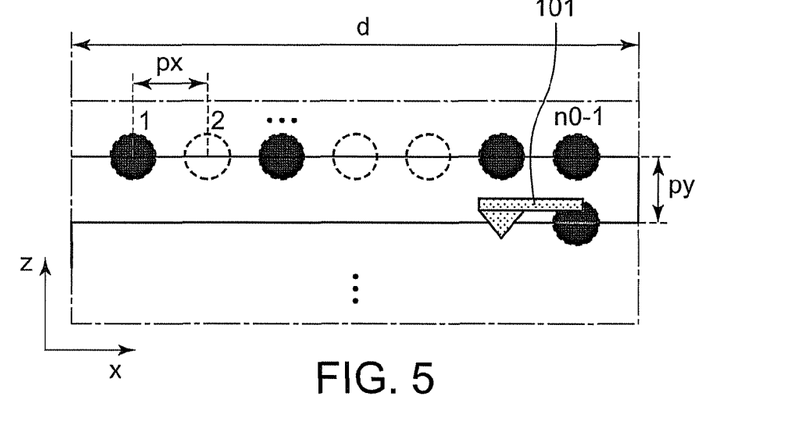
FIG. 5 is a view to describe an appearance in writing.

FIG. 5 is a diagram showing an appearance in writing by the probe 101 within an area (recording area) in which one probe 101 assumes record reproduction. In addition, here a black bit indicates a recorded state (1) and an outline bit indicates a not recorded state (0).

At the time of recording, the probe 101 is resonance-driven in the x direction with an amplitude d, and writes n0-1 bits of one line in this direction. And, after writing the bits of one line in the x axis direction, the probe 101 is sent in the y axis direction by a pitch py, and writes again n0-1 bits of next one line in the x-axis direction.

Figure 6:
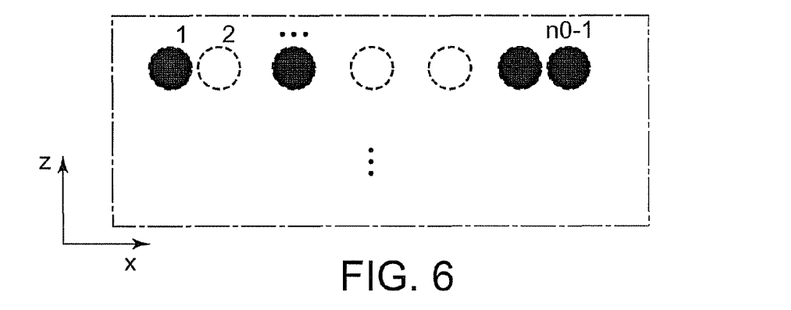
FIG. 6 is a view to describe unevenness of the bits.

Here, in the resonance drive, because a speed of the probe 101 in the x axis direction changes for positions, in case that the probe 101 writes bits at equal time intervals, the bits are uneven in the x axis direction (FIG. 6).

Specifically, at the positions where x=0 and x=d the speed of the probe 101 is 0, and where x=d/2 the speed is maximum. Accordingly, bits are written non-densely at the center of the amplitude, and are written densely at the both ends.

In order to improve the recording density, it is desirable to make a pitch between bits as small as possible and write bits at equal distance pitches within a range where the adjacent bits do not overlap with each other.

Consequently, in the present embodiment, the pitch px between bits in the x axis direction is previously determined to be constant (equal distance pitch), and in order to write n0-1 bits of one line with this pitch px, the timing when the probe 101 writes n0-1 bits of one line is adjusted using the resonance frequency.

Figure 7:
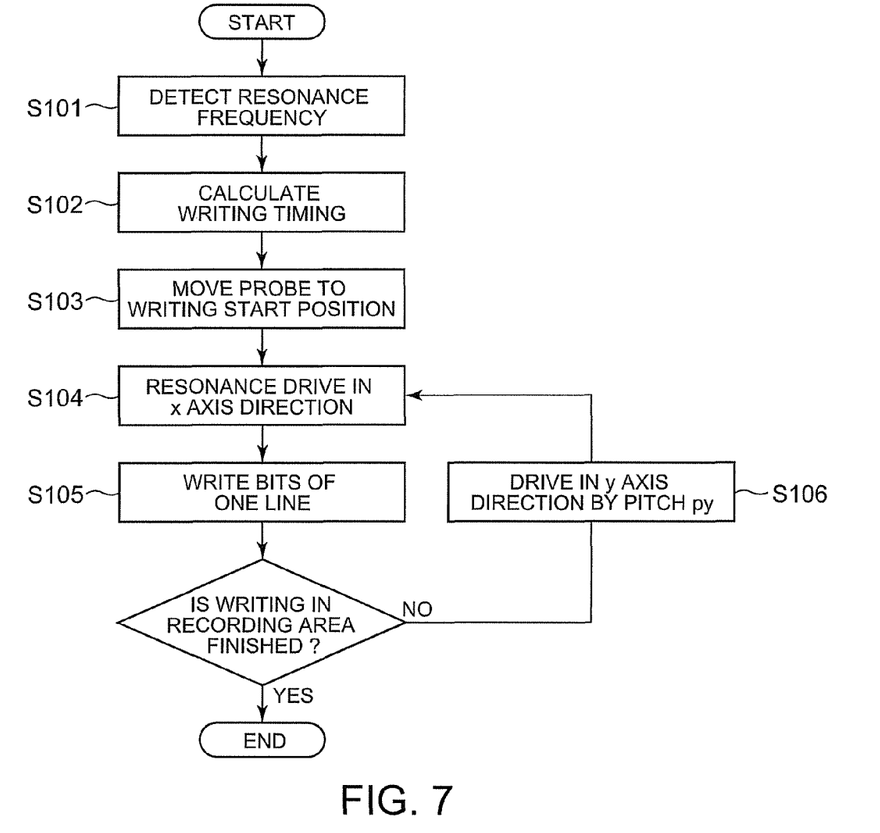
FIG. 7 is a flow chart at the time of writing.

FIG. 7 is a flow chart at the time of writing bits.

(Detecting Unit)

The detecting unit 301 detects a resonance frequency and an amplitude of the stage 201 ahead of the resonance-driving the first driving portion 204 (S101).

Figure 8:
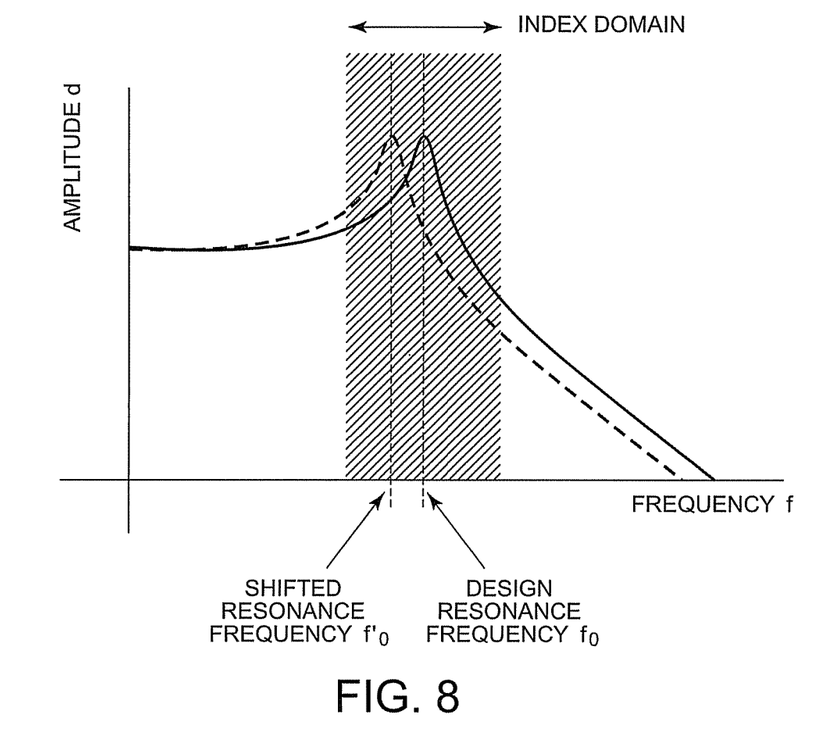
FIG. 8 is a diagram showing a shift of a resonance frequency.

When it is assumed that the design resonance frequency of the stage 201 is f0, the amplitude d of the stage 201 in the case of driving the stage 201 by adding a constant voltage at a frequency f is as shown in a solid line of FIG. 8. That is, in case that f=f0, the amplitude d enlarges with resonance. And thereby resonance-driving becomes possible.

However, a resonance frequency tends to change with the effect of environmental temperature and so on. Here, if it is assumed that a resonance frequency shifts from the above-described design resonance frequency f0 to f'0, in this case, the relation between the frequency f to apply a voltage and the amplitude d of the stage 201 becomes as shown in a broken line of FIG. 8.

Consequently, the detecting unit 301 determines an index domain (shaded portion in FIG. 8) assuming the design resonance frequency f0 as its center in order to detect this f'0. The range of this index domain can be previously given, and in the present embodiment, it is in a range of 0.9 f0~1.1 f0.

Next, the detecting unit 301 divides a frequency of a voltage to be applied to the first driving portion 204 into minute pitches within the range of the index domain (that is, 0.9 f0~1.1 f0), and the voltages of these divided frequencies are respectively applied to the first driving portion 204 for vibration-driving.

And, the detecting unit 301 constantly measures the amplitudes d of the stage 201 in this time with the position sensor 104 to thereby detect the maximum amplitude d, and detects the frequency f when this amplitude d is obtained as the resonance frequency f'0 of the stage 201.

(Calculating Unit)

The calculating unit 303 calculates the writing timing of the probe 101 using the resonance frequency f'0 of the stage 201 which is detected by the detecting unit 301 in the above-described S101 (S102).

In case that the resonance frequency of the stage 201 is f'0, a time required for the probe 101 to reciprocate one time in the x axis direction in the recording area, that is a cycle T of the resonance is given as T=1/f'0. Accordingly, a time required for the probe 101 to write bits of one line is T/2=1/(2 f'0)

In addition, here, because a position where the probe 101 is present at a stationary time can be assumed as a center point at the time of resonance-driving, a point distant from this center point to the left by ½ of the amplitude d of the resonance drive can be determined as a reference point (start position of the resonance drive). In addition, the position here indicates data expressing a position on the coordinate.

In this time, in case that the probe 101 writes bits in sequence while a time instant t is 0 to 1/(2f'0), a position x of the probe 101 from the above-described reference point at the time instant t is given as the following expression.

$$x = [1 - \cos(2\pi f'_0 t)] \cdot d/2 \quad \text{[Expression 1]}$$

On the other hands, when it is assumed that (n0−1) bits are written in one line in the recording area at equal pitches px as described above, a position xn of the n-th bit from the left is given as the following expression.

$$x_n = dn/n_0 \quad \text{[Expression 2]}$$

Bits are written at the timings when the positions x of the probe 101 expressed in (Expression 1) conform to the positions xn expressed in (Expression 2), and thereby (n0−1) bits which are written in one line in the record area are at equal distance pitches.

Consequently, the calculating unit 303 firstly obtains the amplitude d of the resonance drive from the detecting unit 301, and thereby calculates the start position of the resonance drive. Then taking the above-described start position as the reference, the calculating unit 303 calculates the position xn where a bit is written from the (Expression 2) and the position x of the probe 101 at the time instant t from the (Expression 1), and calculates a time instant tn when x=xn from the following expression as a writing timing.

$$t_n = 1/(2\pi f_e) \cdot \cos^{-}(1 - 2n/n_0) \quad \text{[Expression 3]}$$

(Control Unit)

The control unit 302 obtains the start position of the resonance drive from the calculating unit 303, and drives the first driving portion 204 so that the stage 201 moves from the stationary position in the positive direction of the x axis by d/2. In addition, the control unit 302 drives the second driving portion 205 so that the stage 201 moves from the stationary position in the negative direction of the y axis by a predetermined amount. Here, the position of the probe 101 in this state is determined as a writing start position (S103).

Next, the control unit 302 applies a voltage at the resonance frequency f'0 to the first driving portion 204 to thereby resonance-drive the first driving portion 204 (S104). In this time, a starting time point of the resonance drive is determined as a time instant t0, and counting is performed till the time instant 1/(2f'0).

And, the control unit 302 applies the voltage to the probe 101 in accordance with the writing timings given by (Expression 3), and thereby the probe 101 writes bits of (n=1~n0−1), that is the bits of one line of the recording area, from the left in sequence (S105).

Next to the above-described process, the control unit 302 drives the second driving portion 205 so that the stage 201 moves in the positive direction of the y axis by py, to thereby send the probe 101 relatively in the negative direction of the axis by py (S106). And this state is determined as the time instant t0, counting is again performed till the time instant 1/(2πf0), and thereby the probe 101 writes bits of (n=1~n0−1) of one line from the right in sequence.

The above-described processes from S104 to S106 are performed repeatedly till the probe 101 writes bits on all positions in the recording area.

In addition, the bits which are written as described above are not strictly at equal distance pitches in consequence of the noise and so on to each of the driving portions and the control unit 302, and thereby variation is likely generated. However, if this variation is within 10% of the bit pitch px, for example, such a variation does not influence greatly at the time of reading described later.

(Reading)

Figure 9:
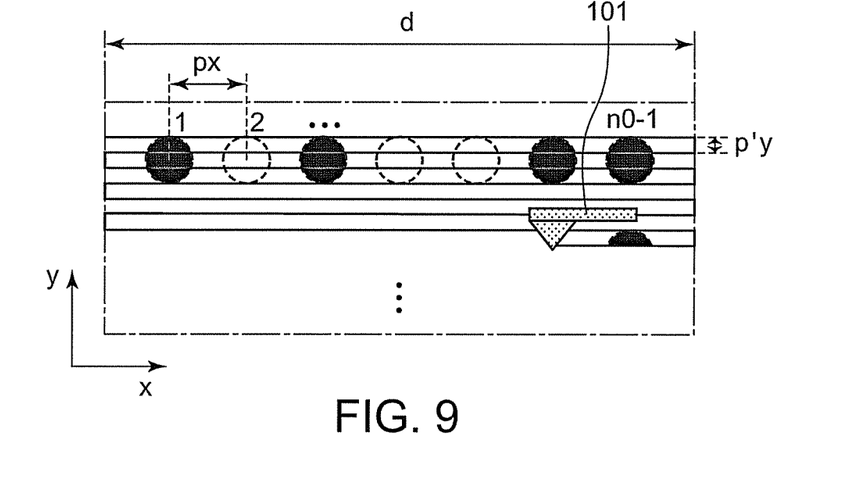
FIG. 9 is a view to describe an appearance in reading.

FIG. 9 is a diagram showing an appearance in reading by the probe 101 within the area (recording area) in which one probe 101 assumes the record reproduction.

At the time of reproducing, the probe 101 is resonance driven in the x direction with the amplitude d, and is concurrently sent in the y axis direction by a pitch p'y for each half cycle. It is desirable that this pitch p'y is sufficiently small compared with the size of a bit in the y axis direction.

Then, the probe 101 performs reading at equal time intervals during this drive, determines as 0 at a domain of a bit in the not recorded state or at a domain where a bit is not formed, and determines as 1 at a domain of a bit in the recorded state. The determination result is stored in the memory 400 as a bit map to reproduce the arrangement of bits.

In this time, because the probe 101 is resonance-driven in the x axis direction similarly as in the recording time, the speed of the probe 101 sinusoidally varies for the positions. For this reason, the reading times are different for the positions, and thereby unevenness is generated among the bits to be read out. In addition, from the similar reason, the shapes of the bits to be read out are distorted in the x axis direction.

For this reason, at the time of discriminating that the read out bit is actually one which has been written in, it is thought that the discrimination is made erroneously.

Accordingly, in the present embodiment, by performing coordinate transformation of the above-described bit map, the shapes of bits and pitches between bits are corrected.

Figure 10:
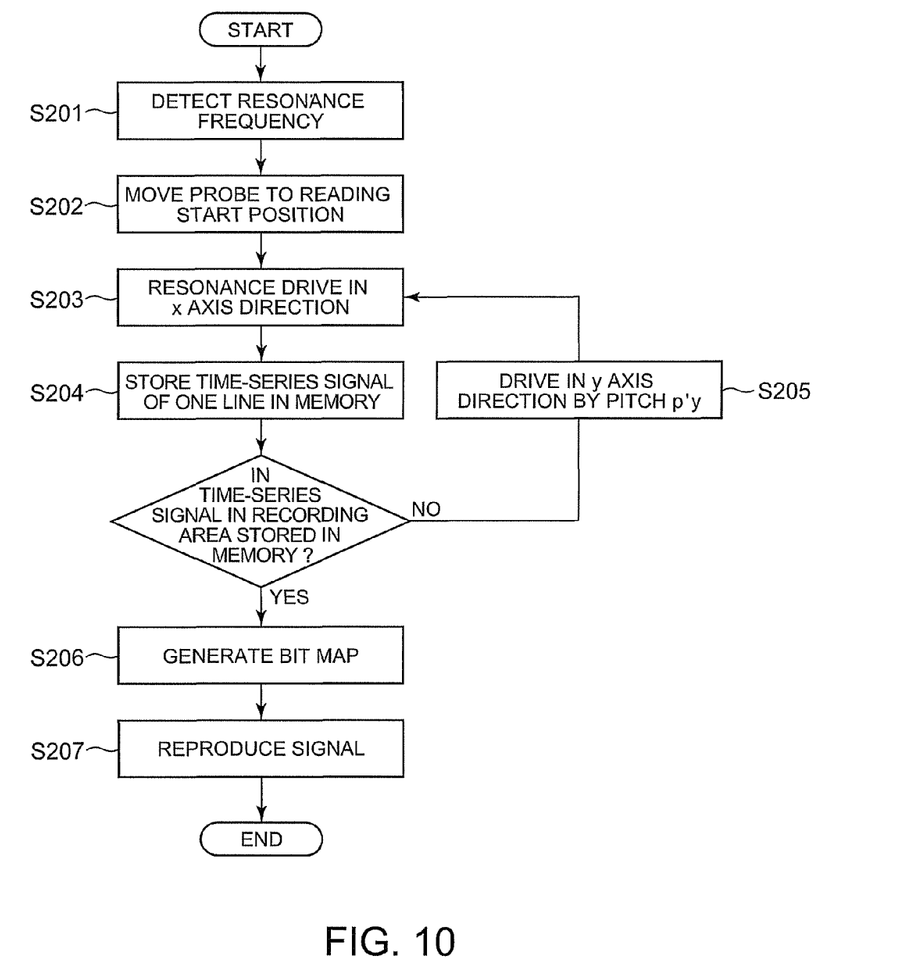
FIG. 10 is a flow chart at the time of reading.

FIG. 10 is a flow chart at the time of reading bits.

(Detecting Unit)

The detecting unit 301 detects the resonance frequency of the stage 201 ahead of the resonance drive of the first driving portion 204, similarly as in the writing time (S201).

That is, the detecting unit 301 determines an index domain assuming the design resonance frequency f0 as its center in order to detect this f0. The range of this index domain can be previously given.

Next, the detecting unit 301 divides the frequency of the voltage to be applied to the first driving portion 204 into minute pitches within the range of the index domain, and the voltages of these divided frequencies are respectively applied to the first driving portion 204 for vibration-driving.

And, the detecting unit 301 constantly measures the amplitude d of the stage 201 in this time with the position sensor 104 and thereby detects the frequency f when the amplitude d becomes maximum as the resonance frequency f0 of the stage 201.

(Control Unit)

The control unit 302 obtains the start position of the resonance drive from the calculating unit 303, and drives the first driving portion 204 so that the stage 201 moves from the stationary position in the positive direction of the x axis direction by d/2. In addition, the control unit 302 drives the second driving portion 205 so that the stage 201 moves from the stationary position in the negative direction of the y axis by a predetermined amount. Here, the position of the probe 101 in this state is determined as a reading start position (S202).

Next, the control unit 302 applies a voltage at the resonance frequency f0 to the first driving portion 204 to thereby resonance-drive the first driving portion 204 (S203).

In addition, at the same time, the control unit 302 constantly applies the voltage to the probe 101 and thereby determines recorded state in a domain of one line which the probe 101 passes through, and stores 1 in the recorded case and 0 in the not recorded case in the memory 400 as a time-series signal (S204).

Next to the above-described process, the control unit 302 drives the second driving portion 205 so that the stage 201 moves in the positive direction of the y axis by p'y, to thereby send the probe 101 relatively in the negative direction of the y axis by p'y (S205). And the control unit 302 determines recorded state in a domain of one line which the probe 101 passes through toward the reverse direction.

The above-described processes from S203 to S205 are performed repeatedly till the probe 101 determines recorded states in the all domains in the recording area.

(Mapping Unit)

The mapping unit 304 generates a bit map using the resonance frequency f0 of the stage 201 which is detected by the detecting unit 301 in S201 and the time-series signal of the recorded states which the control unit 302 has stored in the memory 400 in the repeat processes from S203 to S205 (S206). In addition, this bit map is stored in the memory 400.

Figure 11:
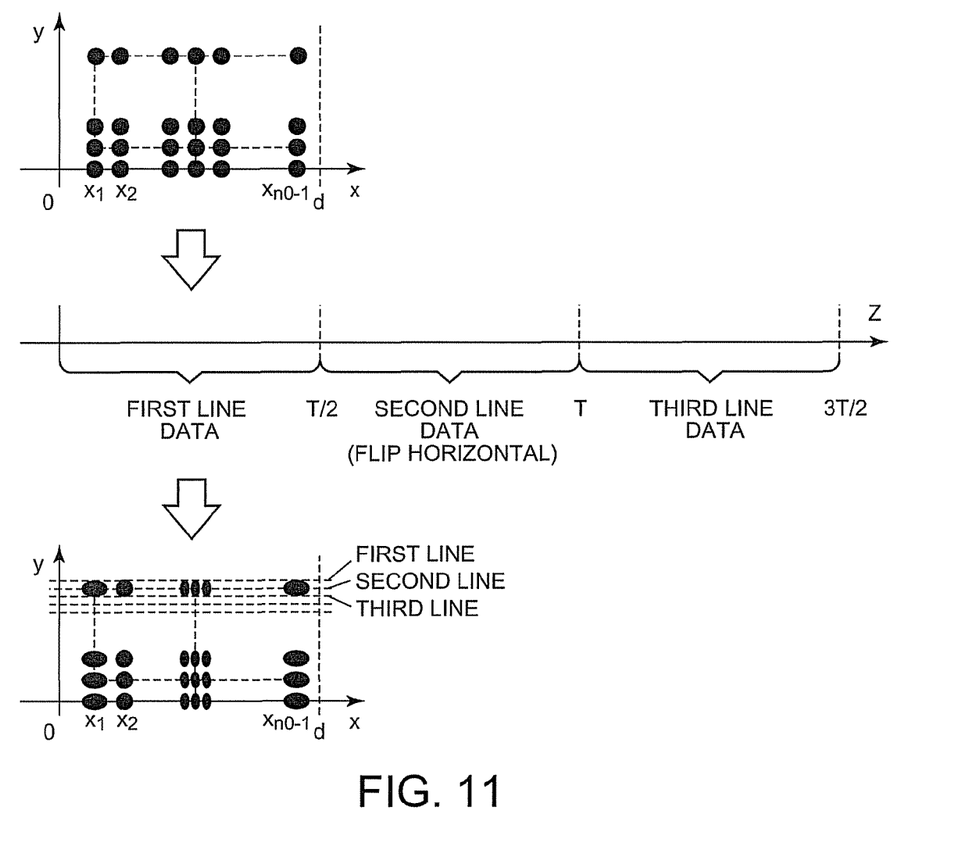
FIG. 11 is a diagram to describe processing of a time-series signal.

To begin with, the time-series signal shown in FIG. 11 is divided such that the signals obtained between the time instants t=0~1/(2f0) are made a first line signal, and signals obtained between the time instants t=1/(2f0)~i/f0 are made a second line signal (hereinafter, repeated in the same manner). And the signals of the even-numbered lines are inverted, and then all the line signals are stacked in the y axis direction from the first line signal in sequence to thereby obtain a two-dimensional time-series signal.

Figure 12A:
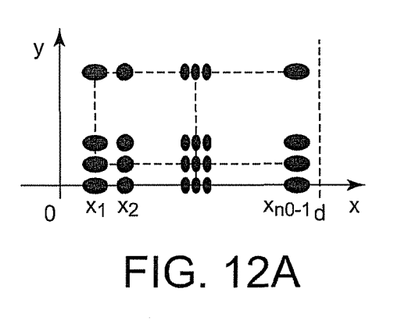
FIG. 12 is a flow chart showing the coordinate transformation in a bit map.

In this time, as shown in FIG. 12(a), unevenness and distortion are generated in the shapes of the read out bits and the pitches between the bits.

However because the time instant when the same bit is written in (Expression 3) and the time instant when the same bit is read out are equal, a position Xn of a n-th bit from the left in the above-described two-dimensional time-series signal is specifically expressed as the following expression.

$$X_n = d \cdot t_n(T/2) = \cos^{-1}(1 - 2n/n_0) \cdot d/\pi \quad \text{[Expression 4]}$$

On the other hands, a position where the n-th bit from the left is actually existing is expressed as the following expression in the same manner as (Expression 2) at the writing time.

$$x_n = dn/n_0 \quad \text{[Expression 5]}$$

Accordingly, there is a relation indicated in the following expression between the position Xn of the bit in the two-dimensional time-series signal and the position xn of the actual bit.

$$X_n = \cos^{-1}(1 - 2x_n/d) \cdot d/\pi \quad \text{[Expression 6]}$$

Figure 12B:
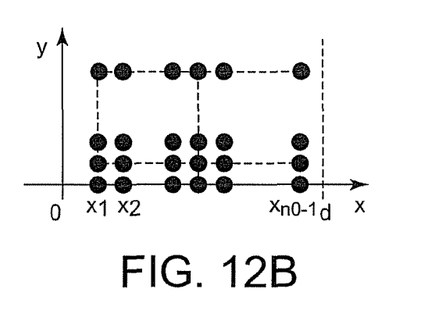

Then, the mapping unit 304 performs the coordinate transformation of the two-dimensional time-series signal based on the following expression obtained from the relation of (Expression 6) using the start position of the resonance drive as a reference, to thereby generate a bit map which realizes the arrangement of bits (FIG. 12(b)).

$$x = d \cdot \sin^2(X\pi/2d) \quad \text{[Expression 7]}$$

With the above-described coordinate transformation, the shapes of bits and the pitches between bits can be corrected, and thereby the bit map in which the arrangement of bits is accurately realized can be generated.

(Reproducing Unit)

The reproducing unit 305 discriminates the bits in the bit map generated by the mapping unit 304, to thereby reproduce the signal (S207). In this time, the signal can be reproduced with high precision by using the accurate bit map made by the mapping unit 304.

According to the memory device, the recording method and the recording and reproducing method of the above-described embodiment, it become possible to record signals with high precision.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device, comprising:
   a recording medium to store a signal;
   a probe to write a plurality of the signal in the recording medium in a first direction;
   a first driving portion to vibratory drive the probe or the recording medium in the first direction;
   a detecting unit which, before a writing operation, when the first driving portion changes a frequency to vibratory drive the probe or the recording medium in the first direction, detects a change in an amplitude of a resonance drive, and detects the frequency at which the amplitude becomes maximum as a resonance frequency; and
   a calculating unit which, before the writing operation, calculates a timing when the probe writes a plurality of the signals into the recording medium using the resonance frequency;
   wherein, at the time of writing, the first driving portion vibratory drives the probe or the recording medium in the first direction at the resonance frequency, and the probe writes a plurality of the signals into the recording medium at the timing.

2. The memory device as recited in claim 1, wherein:
   the calculating unit calculates writing start position data of the signals using the amplitude detected by the detecting unit, and calculates the timing based on the writing start position data.

3. The memory device as recited in claim 2, wherein:
   the calculating unit calculates, as the timing, a plurality of time instants at which writing position data of the signals are at equal distance pitches from the writing start position data in the first direction.

4. The memory device as recited in claim 1, further comprising a mapping unit, wherein:
   the probe reads out the signal from the recording medium;
   the calculating unit calculates reading start position data of the signal using the amplitude detected by the detecting unit; and
   the mapping unit corrects the reading position data of the signal based on the reading start position data.

5. The memory device as recited in claim 1, further comprising:
   a second driving portion to drive the probe or the recording medium in a second direction which is different from the first direction in a horizontal plane of the recording medium; and
   a third driving portion to drive the probe or the recording medium in a third direction which is approximately orthogonal to the first direction and the second direction.

6. A recording method to record a signal, by vibration-driving a probe which writes the signal in a first direction or the recording medium in a first direction, in the recording medium for storing the signal, the recording method comprising:
   detecting a change in an amplitude of the resonance drive when the probe or the recording medium is vibration-driven in the first direction by changing a frequency;
   detecting the frequency at which the detected amplitude becomes maximum as a resonance frequency;
   calculating a timing when the probe writes the signal into the recording medium using the detected resonance frequency; and
   vibration-driving the probe or the recording medium in the first direction at the resonance frequency at the time of writing, and writing a plurality of the signals into the recording medium at the detected timing by the probe.

7. The recording method as recited in claim 6, further comprising:
   calculating writing start position data of the signals using the detected amplitude; and
   calculating the timing based on the writing start position data.

8. The recording method as recited in claim 7, further comprising:
   calculating time instants at which writing position data of the signals are at equal distance pitches from the writing start position data in the first direction.

9. The recording method as recited in claim 8, further comprising:
   driving the probe or the recording medium in a second direction which is different from the first direction in a horizontal plane of the recording medium; and
   driving the probe or the recording medium in a third direction which is approximately orthogonal to the first direction and the second direction.

10. A recording and reproducing method to record and reproduce a signal by vibration-driving a probe to write the signal in a recording medium to store the signal in a first direction or the recording medium in the first direction, the recording and reproducing method comprising:
    detecting a change in an amplitude of the resonance drive when the probe or the recording medium is vibration-driven in the first direction by changing a frequency;
    detecting the frequency at which the detected amplitude becomes maximum as a resonance frequency;
    calculating a timing when the probe writes the signal into the recording medium using the detected resonance frequency;
    vibration-driving the probe or the recording medium in the first direction at the resonance frequency at the time of writing, and writing a plurality of the signals into the recording medium at the detected timing by the probe; and
    reading the signals from the recording medium by the probe.

11. The recording and reproducing method as recited in claim 10, further comprising:

calculating reading start position data of the signals at the time of reading using the detected amplitude; and correcting reading position data of the signals based on the reading start position data.

12. The recording and reproducing method as recited in claim 11, further comprising:

calculating writing start position data of the signals using the detected amplitude; and calculating the timing based on the writing start position data.

13. The recording and reproducing method as recited in claim 11, further comprising:

calculating time instants at which writing position data of the signals are at equal distance pitches from the writing start position data in the first direction.

14. The recording and reproducing method as recited in claim 11, further comprising:

driving the probe or the recording medium in a second direction which is different from the first direction in a horizontal plane of the recording medium; and driving the probe or the recording medium in a third direction which is approximately orthogonal to the first direction and the second direction.

* * * * *